(12) United States Patent
Barnea et al.

(10) Patent No.: US 6,396,164 B1
(45) Date of Patent: May 28, 2002

(54) METHOD AND APPARATUS FOR INTEGRATING CONTROLS

(75) Inventors: Michael Barnea, Highland Park; Mark A. Ruthenbeck, Gurnee, both of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/421,654

(22) Filed: Oct. 20, 1999

(51) Int. Cl.⁷ .................................................. B60L 1/00
(52) U.S. Cl. ........................... 307/10.1; 701/36; 701/49
(58) Field of Search .................. 307/9.1, 10.1; 701/36, 48, 49; 340/825.52

(56) References Cited

U.S. PATENT DOCUMENTS

| | | | |
|---|---|---|---|
| 6,032,089 A | * | 2/2000 | Buckley ...................... 701/36 |
| 6,114,970 A | * | 9/2000 | Kirson et al. ........... 340/825.52 |
| 6,163,079 A | * | 12/2000 | Miyazaki et al. ........... 307/10.1 |
| 6,189,057 B1 | * | 2/2001 | Schwanz et al. ............... 701/72 |
| 6,236,918 B1 | * | 5/2001 | Sonoda et al. ................ 701/36 |
| 6,240,347 B1 | * | 5/2001 | Everhart et al. .............. 701/36 |

* cited by examiner

*Primary Examiner*—Josie Ballato
*Assistant Examiner*—Sharon Polk
(74) *Attorney, Agent, or Firm*—Gary J. Cunningham; Steven A. May

(57) ABSTRACT

Electronic devices (38) are added to the electrical system (10) of a motor vehicle and utilize controls (20–26) and indicators (14) existing within the vehicle. The add-on electronic devices (34–38) interact with a gateway (30), and the gateway (30) is coupled to the electrical system (10). The function of the controls (20–26) and indicators (14) within the vehicle are context controlled relative to the operating context of the existing vehicle electronic systems and the add-on electronic devices (34–38).

19 Claims, 2 Drawing Sheets

METHOD AND APPARATUS FOR INTEGRATING CONTROLS

FIELD OF THE INVENTION

The present invention relates generally to vehicle electrical systems, and more particularly, to a method and apparatus for integrating control functions within a vehicle electrical system.

BACKGROUND OF THE INVENTION

Motor vehicles have seen a tremendous increase in the use of in-vehicle electronics. Many of these in-vehicle electronics are adapted to provide the vehicle driver and occupants with a vast amount and array of data and information via wireless communication technology, and to allow them to communicate data and information outside of the vehicle also using wireless technology. An example of these electronics devices are on-board navigation systems, remote vehicle diagnostic systems, real-time weather service, voice communication, Internet access, email and paging. However, since the design cycle for the typical motor vehicle is relatively long as compared to the design cycle for new electronic devices, new state-of-the art electronic products are available but may not be readily adaptable to the motor vehicle.

Many motor vehicles are designed with an original equipment manufacturer (OEM) communication bus structure that allows the original equipment (OE) electronic devices to communicate with each other and with device controllers and with other vehicle systems connected to the bus. This bus structure, however, typically operates using a proprietary communication protocol. The OE devices connected to the OEM bus are generally designed and engineered or specified by the vehicle manufacturer such that they are completely compatible with the proprietary protocol. However, since each manufacturer may have its own protocol, devices that are typically available as aftermarket equipment may not readily interface with the OEM bus. In addition, in view of the many governmental requirements for vehicle certification, safety, fuel economy, emissions, etc., and the possibility of adverse interactions between add-on devices with the vehicle systems, many manufacturers restrict the ability to add devices directly to the OEM bus even if designed to be compatible. Hence, one will appreciate that while numerous state-of-the-art electronic devices are being introduced into the market place, many such devices are not easily adapted to the many different motor vehicles.

It has been proposed to provide a gateway to the OEM bus that permits a limited amount of interaction between add-on electronic devices and the OEM bus. However, having generally restricted direct access to the OEM bus, the vehicle manufacturers have also, as a result, generally restricted access to the various controls and indicators, e.g., switches, buttons, displays, etc., within the vehicle that provide control input and feedback to and from the many different features and functions contained within the vehicle. For example, it is now common to include control switches on the steering wheel that allow the vehicle operator to control such things as the heating, ventilating and air conditioning (HVAC) system, the radio, and the like. It is also common to provide vehicle information systems that display various information relating to the operation of the vehicle. While it has been only suggested to have such a gateway permit interaction of the OE controls and indicators with the add-on devices, a suitable architecture and methodology that actually permits such interaction has not been achieved. Therefore, each add-on electronic device still requires a set of controls and displays separate from the vehicle controls and displays.

Thus there is a need for a method and apparatus of integrating the controls and indicators of add-on devices with the existing electronic devices within a motor vehicle.

DETAILED DESCRIPTION OF THE PREFERRED EMBODIMENTS

In accordance with the invention, electronic devices are added to the electrical system of a motor vehicle and utilize controls and indicators existing within the vehicle. The add-on electronic devices interact with a device bus, and the device bus interfaces with the vehicle bus and vehicle electrical system via a gateway. The function of the controls and indicators within the vehicle are context controlled relative to the operating state of the existing vehicle electronic systems and the add-on electronic devices.

Figure 1:
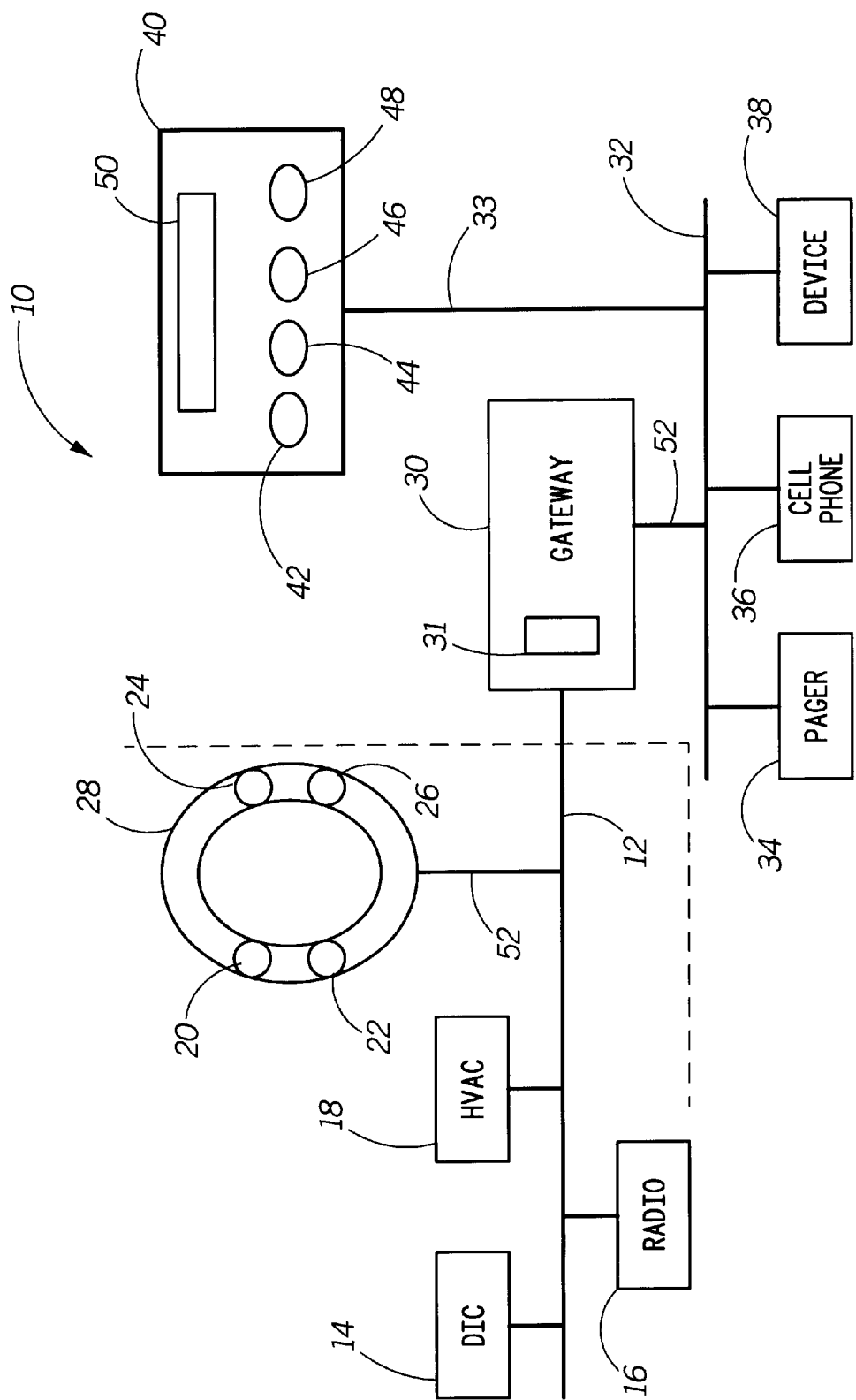
FIG. 1 is a block diagram illustration of vehicle electronic system architecture in accordance with a preferred embodiment of the invention.

Referring to FIG. 1, a vehicle electrical system 10 includes an original equipment manufacturer (OEM) data bus, vehicle bus 12, to which various original equipment (OE) electronic devices are coupled. As shown in FIG. 1, at least a driver information center (DIC) 14, a radio 16 and an HVAC controller 18 are coupled to the vehicle bus 12. The DIC 14 includes a suitable display, such as a light emitting diode (LED) or liquid crystal (LC) display that may provide text and graphic information to the driver. Also coupled to the vehicle bus 12 are controls 20, 22, 24 and 26, e.g., switches, that as illustrated in FIG. 1 may be provided on a steering wheel 28 of the vehicle.

Coupled to the vehicle bus 12 is a gateway 30. The gateway 30 couples the vehicle bus 12 with a device bus 32. To the device bus 32 is coupled to numerous additional electronic devices such as pager 34, cellular telephone 36 and other electronic devices generally indicated as device 38. The other devices that may be coupled to the device bus 32, without limiting the number or type of devices, include navigation systems, infrared transceivers, personal computers, personal digital assistants, communication/data ports or docking stations, and the like. The devices coupled to the device bus 32 may communicate on a peer-to-peer basis permitting the device bus 32 to operate without a separate bus controller, and each device may further include memory for retaining operating information. While the preferred embodiment shown in FIG. 1 shows the electronics devices coupled to the gateway 30 by way of the device bus 32, it will be appreciated that the device bus 32 may not be necessary and the electronic devices may be coupled directly to the gateway 32

Also coupled to the data bus 32 is an auxiliary control assembly 40 including a plurality of controls, 42, 44, 46 and 48, e.g., switches. The control assembly 40 may also include a display or indicators such as a LC display, LEDs, a voice synthesizer or an audible signal generator all generally illustrated as display 50. As will be described, the devices 34–38 may be controlled and operated using the vehicle controls 20–26 and/or the controls 42–48.

The controls 20–26 provide control signals which are communicated along a data link 52 to the vehicle bus 12 and hence to the gateway 30. In accordance with the invention, the controls 20–26 are not associated with the operation of any one particular electronic device, e.g., devices 16 and 18 coupled to vehicle bus 12 or devices 34–38 coupled to the device bus 32. Whether the operation of any device is effected by manipulation of controls 20–26 depends on the current operating context of the electronic system 10. Similarly, controls 42–48 are not associated with the operation of any one particular device. Furthermore, the information provided or displayed by either the DIC 14 and/or the display 50 may depend on the operating context.

In a preferred embodiment, the operating context may be determined by the gateway 30. The gateway 30 may further include a memory 31 in which the various operating contexts of the electronic system 10 are stored. Associated with each of the operating contexts stored within the memory 31 is control data. The control data provides a mapping of control manipulations to control data appropriate for the given device.

Operating context may be established in a number of ways. For example, a default context may exist wherein manipulation of the controls 20–26 and 42–48 control a default electronic device or devices. For example, controls 20 and 22 may, in the default context, control the volume, up or down, respectively, of the radio 16. The operating context may be selectable. For example, from the default context control 24 may manipulate a scrolling list of operating context choices on either or both of DIC 14 and display 50 while control 26 may permit selection of a particular operating context. Upon selection, the electronic system 10 enters the operating context.

In accordance with a preferred embodiment of the invention, the operating context may be automatically selected based upon activation or operating state of a device. For example, if a page, e.g., data from an external source, is received by the pager 34, the pager 34 may send a message to the gateway 30 via the data link 52 indicating that a page has been received. The gateway 30 then automatically enters the operating context for the pager 34. If the previous operating context was the default operating context, the control 20 and 22 may be modified such that instead of effecting upon actuation radio volume, manipulation now provides for page acknowledgment and page read functions, respectively. That is, upon actuating control 20, a signal is received by the gateway 30. According to the operating context for the pager 34, the gateway 30 maps the input from control 20 to control data for the pager 34 that instructs the pager 34 to acknowledge the page. The gateway 30 then sends the data to the pager 34 via the link 52 and the device bus 32. Similarly, an input received from control 22 is mapped to control data for pager 34 to read the page. Upon receiving the control data to read the page, the pager 34 places the page data on the device bus 32. With the operating context established for the pager 34, the page data received by the pager 34 is provided to the DIC 14 and/or the display 50 and appropriately displayed.

The default operating context may be returned to following a time-out period. For example, once the page data has been displayed, after the time-out period the operating context may revert back to the default operating context. Alternatively, the vehicle operator may select a new operating context, for example, if in response to the page the vehicle operator wants to make a call using the cell phone 36. Still, activation of another device may cause the electronic system to enter a different operating context.

It will be appreciated that some operating contexts may have priority over others such that a current operating context is maintained even in light of a change in a device operating state. Alternatively, hybrid or temporary operating contexts may be created. For example, if the current operating context is that associated with the cell phone 36, controls 20 and 22 may control the speaker volume for the cell phone 36. If a page is received by the pager 34, a temporary mapping may be established by the gateway 30 so that control 20 provides control inputs to the pager 34 to acknowledge the page, after which control 20 again provides speaker volume control.

Auxiliary control assembly 40 and the associated controls 42–48 may provide operation similar to controls 20–26. That is, control 42 may provide the same function as control 20, control 44 the same as control 22 and so on. Alternatively, controls 42–48 may provide different functions. Whether the controls 42–48 provide the same or different function as controls 20–26 is again dependent on the operating context. For example, in the default context, it may be preferred to have the controls 42–48 operate one or more of the devices 34–38 while the controls 20–26 operate one or more of the devices 16 and 18. It should be further appreciated that certain controls may have fixed functions. That is, certain controls may provide the same function regardless of operating context. Of course, each device may still have its own set of dedicated controls; however, it should be appreciated that these controls too may be made flexible in accordance with the invention.

Figure 2:
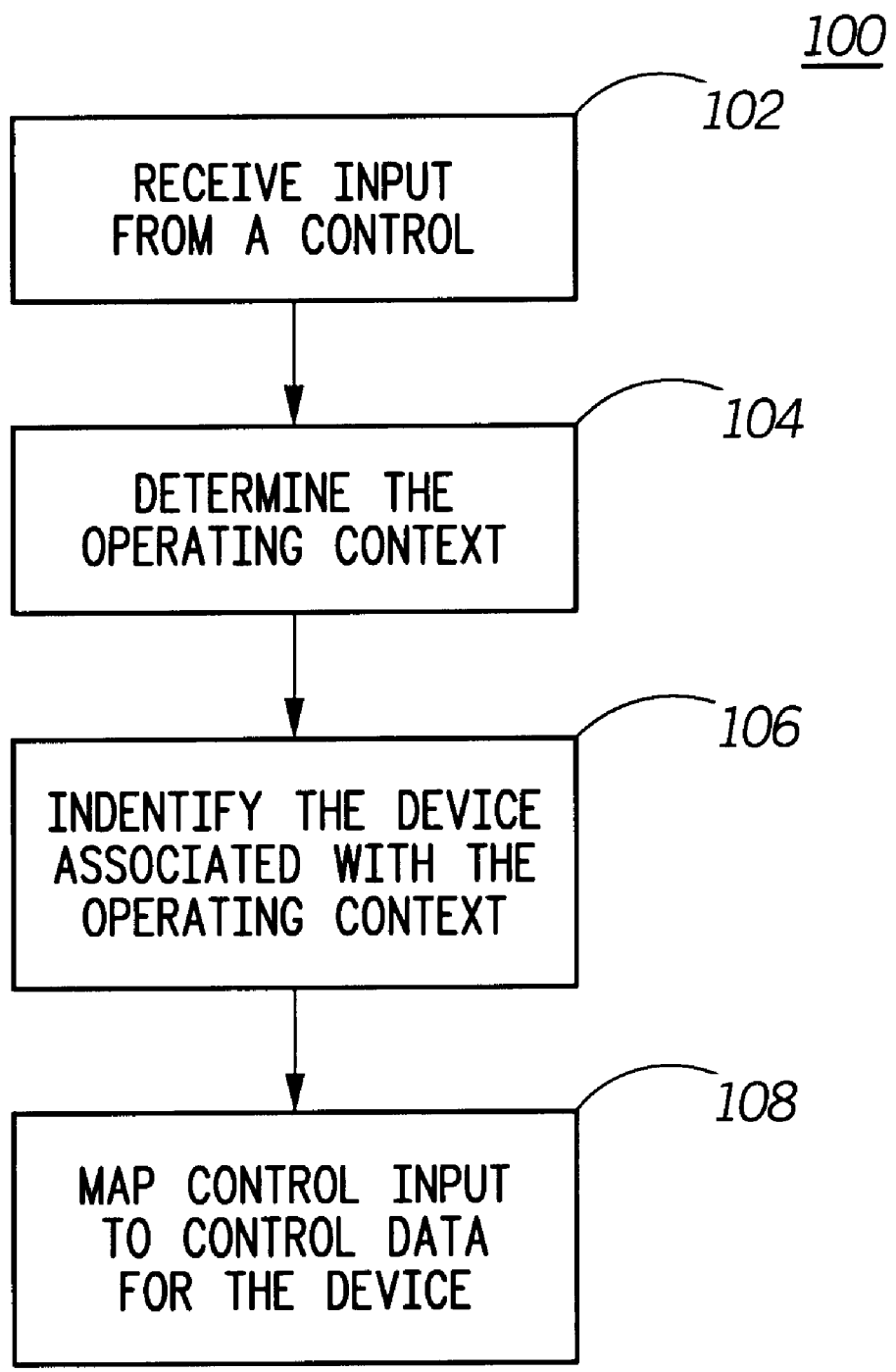
FIG. 2 is a flow chart illustrating a method of integrating controls and functions in accordance with a preferred embodiment of the invention.

With reference to FIG. 2, a method 100 in accordance with the invention begins at step 102 with receipt of an input from at least one of the controls 20–26 and 42–48. The gateway 30 then determines the operating context of the electronic system 10, step 104. Depending on the operating context, i.e., which device the operating context is associated with, step 106, the input is mapped to control data for the appropriate device, step 108. Thus, the invention provides a method of utilizing the controls already within a vehicle to control devices that are later added to the vehicle.

As described, the gateway 30 may retain the data necessary to determine the current operating context as well as the data necessary to map inputs from the controls 20–26 and 42–48 to control data for the appropriate device. When a device is added to the device bus 32, the device may preferably report data to the gateway 30 that defines the device's operating context and associated control data. Thus, new devices are easily added to the electronic system 10 utilizing the controls and indicators already associated with the electronic system 10.

Still other modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the intention, and the exclusive use of all modifications which come within the scope of the appended claims is reserved.

We claim:

1. A method of controlling a vehicle electronic system, the vehicle electronic system comprising a plurality of electronic devices coupled by a gateway to an original equipment manufacturer (OEM) control, the method comprising the steps of:

establishing one of a plurality of operating contexts of the vehicle electronic system, wherein each operating context of the plurality of operating contexts is associated with an operation of an electronic device of the plurality of electronic devices;

receiving an input from the OEM control;

determining whether the operating context is an operating context associated with a first electronic device of the plurality of electronic devices; and modifying the OEM control for providing control data appropriate to the operation of the first electronic device when the operating context is the operating context associated with the first electronic device.

2. The method of claim 1, further comprising the step of controlling the first electronic device from the original equipment manufacturer (OEM) control.

3. The method of claim 1, wherein the operating context is established by an activation of the first electronic device.

4. The method of claim 1, wherein the operating context is established by receipt from an external source of data by the first electronic device.

5. The method of claim 1, further comprising a step of providing from the first electronic device context information to the gateway, the context information identifying the operating context associated with the first electronic device and the control data associated with the operation of the first electronic device.

6. The method of claim 1, wherein the electronic system further comprises at least one indicator coupled to the gateway, and the method further comprises the steps of:

providing indication data from the first electronic device and indicating the indication data on the indicator.

7. The method of claim 6, wherein the indication data indicates the operating context.

8. The method of claim 1, wherein the step of determining comprises a step of determining whether the operating context is an operating context associated with a first electronic device of the plurality of electronic devices or with a second electronic device of the plurality of electronic devices, and wherein the step of modifying comprises steps of:

modifying the control for providing control data appropriate to the operation of the first electronic device when the operating context is the operating context associated with the first electronic device; and modifying the control for providing control data appropriate to the operation of the second electronic device when the operating context is the operating context associated with the second electronic device.

9. The method of claim 8, wherein the first electronic device is operably coupled to the gateway via a device bus and wherein the second electronic device is operably coupled to the gateway via a vehicle bus.

10. A vehicle electronic system comprising:

an original equipment manufacturer (OEM) control;

a gateway operably coupled to the OEM control;

a plurality of electronic devices coupled to the gateway;

the vehicle electronic system having at least one operating context associated with each electronic device of the plurality of electronic devices; and wherein the gateway contains data identifying the operating context associated with each electronic device and further contains control data associated with the operation of the electronic device, and within the operating context, provides control data to the electronic device responsive to an input from the OEM control, allowing the OEM control to control each device based on the operating context.

11. The vehicle electronic system of claim 10, wherein the original equipment manufacturer OEM control comprises one or more of a vehicle control and an auxiliary control, wherein the vehicle control is operably coupled to the gateway via a vehicle bus, wherein the auxiliary control is operably coupled to the gateway via a device bus, wherein a first electronic device of the plurality of electronic devices is coupled to the vehicle bus, wherein a second electronic device of the plurality of electronic devices is coupled to the device bus, and wherein each of the vehicle control and the auxiliary control is capable of operating each of the first electronic device and the second electronic device.

12. The vehicle electronic system of claim 10, wherein a first electronic device of the plurality of electronic devices comprises a vehicle device operably coupled to the via a vehicle bus, and wherein the gateway contains data identifying an operating context associated with the vehicle device and control data associated with the operation of the vehicle device.

13. The vehicle electronic system of claim 10, further comprising at least one indicator operably coupled to the gateway.

14. The vehicle electronic system of claim 10, wherein at least one electronic device of the plurality of electronic devices comprises one of the group of devices consisting of a pager, a cellular telephone, a personal computer, a personal digital assistant, a navigation system, an infrared interface, an entertainment device and a data port.

15. The vehicle electronic system of claim 10, further comprising a device bus coupled to the gateway and wherein at least one electronic device of the plurality of electronic devices is coupled to the device bus.

16. The vehicle electronic system of claim 15, further comprising a vehicle bus and wherein at least one electronic device of the plurality of electronic devices is coupled to the vehicle bus.

17. The vehicle electronic system of claim 10, wherein the original equipment manufacturer (OEM) control comprises a switch device.

18. The vehicle electronic system of claim 10, wherein the original equipment manufacturer OEM control comprises a switch in an OEM auxiliary control assembly.

19. The vehicle electronic system of claim 10, wherein the original equipment manufacturer OEM control comprises a switch on a steering wheel.

* * * * *